March 21, 1967 H. HARGASSER ETAL 3,310,717

ENCAPSULATED SEMICONDUCTOR DEVICE WITH MINIMIZED COUPLING CAPACITANCE

Filed May 22, 1964

United States Patent Office 3,310,717
Patented Mar. 21, 1967

3,310,717
ENCAPSULATED SEMICONDUCTOR DEVICE WITH MINIMIZED COUPLING CAPACITANCE

Hans Hargasser and Kornelius Noss, both of Munich, Germany, assignors to Siemens & Halske Aktiengesellschaft, Berlin, Germany, a corporation of Germany Filed May 22, 1964, Ser. No. 369,489
Claims priority, application Germany, May 27, 1963, S 85,392, S 85,393
16 Claims. (Cl. 317—235)

Our invention relates to encapsulated semiconductor devices with at least three electrodes, such as transistors.

As a rule, transistors and other controllable semiconductor devices are enclosed in hermetically sealed capsules by means of housing structures which partly consist of insulating material and partly of metal so as to permit connecting the semiconductor electrodes with external circuits through the sealed capsule. It is known to fasten a semi-conductor member proper upon a plunger-like or plate-shaped base portion of the housing structure, the upper portion of the housing being formed by a cup or bell which is sealed with the base portion to prevent ingress of air or humidity. In many transistors thus encapsulated, the base electrode has a ring-shaped design.

Relative to the attachment of electric contacts and the mounting of transistors to be used for high-frequency purposes, a problem is posed by the requirement that the increase in operating frequency afforded by the particular construction of such transistors, for example mesa transistors, is not impaired or nullified by effects resulting from the contact attachment or mountnig. Above all, the external coupling capacitances fundamentally occurring in transistor operation, must be extremely slight because otherwise the collector-emitter capacitance when operating in grounded-base configuration may give cause to self-excitation of the transistor, and the same effect may be due to the collector-base capacitance when operating in grounded-emitter configuration, thus considerably affecting the performance at high frequencies.

It is an object of our invention to devise a type of encapsulated mounting for transistors and other controlled semiconductor devices, especially those intended for operation at high frequencies, in which the detrimental effect of the above-mentioned coupling capacitances is greatly minimized.

According to our invention, we mount the transistor or other semiconductor member on the front face of a cylindrical conductor rod, constituting essentially a plunger-shaped electrode conductor, and we further provide two mutually insulated ring-shaped electrode conductors which extend in coaxial relation to the conductor rod and are connected with respective two electrodes located on the side of the semiconductor member facing away from the side that forms the third electrode and is conductively joined with the end face of the axial conductor rod. Further provided is a composite housing structure which is tightly joined with the conductor rod and with the ring-shaped conductors to enclose and hermetically seal the semiconductor member, the housing structure and the ring-shaped conductors being rotationally symmetrical with respect to the axis of the conductor rod.

According to another feature of our invention, the above-mentioned ring-shaped conductors extend radially and peripherally through the housing structure to the outside.

While we prefer using ring-shaped conductors of circular shape, the term "ring-shaped" is here understood to also relate to other closed loop shapes such as triangular, square or other polygonal shapes. While it is further preferable to have the inner opening of each ring-shaped conductor member in circular shape, the outer periphery may be given any other suitable configuration. As will be apparent from the embodiment described hereinafter, the ring-shaped conductor members may be designed as flat discs of sheet metal, or may also be given a partly cup-shaped or other configuration, particularly at the locality where these conductor members are joined by, and sealed with, adjacent parts of the encapsulating housing structure.

As a rule, however, it is preferable to provide ring-shaped conductor members and to compose the housing structure of ring-shaped insulating parts which are all essentially circular and rotationally symmetrical to the axis of the cylindrical conductor rod, and relative to which the encapsulated semiconductor member is mounted in substantially centered position.

According to still another feature of our invention, relating particularly to transistors of the mesa or planar types, we attach the collector side of the transistor to the end face of the conductor rod, for example by soldering or alloying, whereas the ring-shaped conductor members are conductively connected with the emitter and base respectively of the transistor, the latter two electrodes being located on the semiconductor side remote from that attached to the conductor rod.

The conducting connection between the ring-shaped conductor members and the respective electrodes may be effected by having the conductor member directly engage the electrodes on the semiconductor member of the transistor. It is preferable, however, to provide a conducting intermediate member, for example a connector having a point in contact with one of the respective electrodes. On account of the small size of the transistor, it is preferable to employ for this purpose a thin wire, for example of gold or gold alloy, which is firmly connected with the ring-shaped conductor member and with the electrode on the semiconductor surface, preferably by thermocompression. The latter type of connection is employed in the illustrated embodiment described hereinafter.

The above-mentioned and further objects, advantages and features of our invention, said features being set forth with particularity in the claims annexed hereto, will be apparent from and will be described in, the following with reference to the embodiments of encapsulated transistors according to the invention illustrated by way of example in the accompanying drawings, in which:

The illustrated device comprises a plunger-shaped cylindrical conductor rod 1 which forms a collar 1*a* in its upper portion. A mesa transistor has its collector zone, covering the entire planar bottom surface of the semiconductor body, firmly soldered or alloyed to the end face of the conductor rod 1, the junction being barrier-free. The transistor 2 is centered with respect to the axis of the rod 1. Seated on the collar 1*a* is an insulating ring 3 which is fused or otherwise hermetically sealed with the top portion of the conductor rod 1. The planar top surface of the cylindrical ring 3 is substantially flush with the bottom side of the mesa transistor 2.

Figure 1:
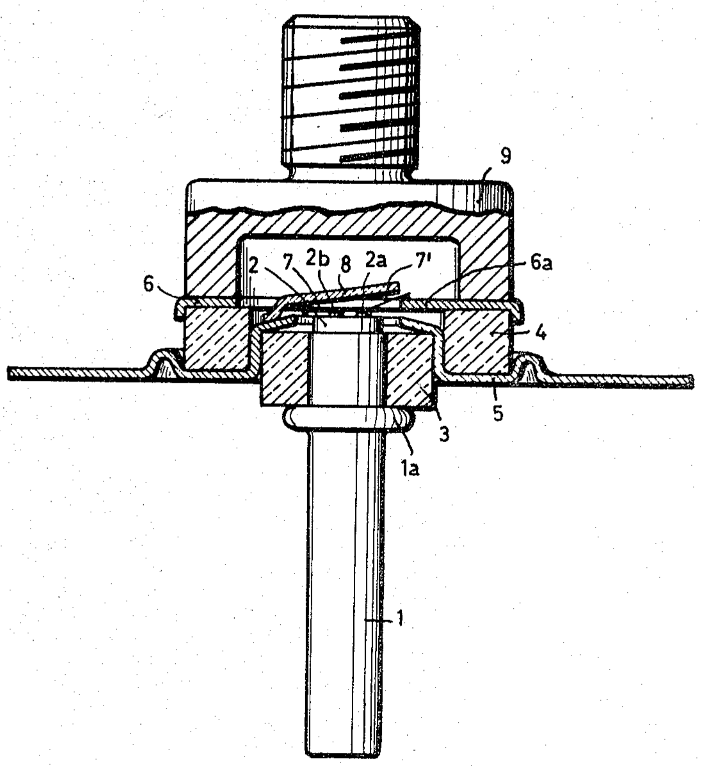
FIG. 1 shows the transistor substantially in axial section.

The upper portion of the insulating ring 3 is surrounded by a similar ring 4 also consisting of insulating material but having a larger diameter. A ring-shaped base electrode conductor member 5 of sheet metal has a cup-shaped and centrally apertured middle portion whose cylindrical wall extends tightly between the insulating rings 3 and 4, the ring 4 being seated on a pan-shaped portion of the conductor member 5. A second ring-shaped conductor member 6 of metal is located between the insulating ring and the cup-shaped cover 9 of the encapsulating housing. The cover 9 may consist of copper, and a threaded stud may be integral with the cover portion 9 in coaxial alignment with the rod 1 as shown in FIG. 1.

To provide for the desired hermetic sealing of the housing, the insulating rings 3 and 4 are preferably made of dark glass or of ceramic so that the rings can be vacuum-tightly fused together with the adjacent metal parts, namely the ring-shaped conductor members 5, 6 and the collector conductor 1. For permanence of the sealed joints, it is advisable to use for the insulating rings 3 and 4 a material whose thermal coefficient of expansion is approximately similar to that of the metal parts 1, 5 and 6. Suitable, for example, are molybdenum, or such alloys as are available in commerce under the trade names Kovar and Vacon, these metals having a coefficient of expansion which within the occurring operating temperatures is sufficiently close to that of suitable glasses, glazes and ceramics. Since the cover portion 9 of the housing is in contact only with the metal of the conductor member 6, being preferably joined therewith by soldering, the just-mentioned desirability for similar coefficients of expansion does not apply to the cover which, as mentioned, may be made of copper.

The ring-shaped conductor member 6 for the emitter is essentially planar. It is punched of sheet metal and coaxially surrounds the mesa transistor 2. This also applies essentially to the ring-shaped conductor member 5 for the base electrode. At least the top side of the conductor member 6 for the emitter 2*a* should be slightly higher than the top plane of the mesa transistor 2 in cases where the emitter 2*a* is connected with the conductor member 6 by a thin wire 7′, 7′ of gold or gold alloy, as is the case in the illustrated embodiment.

The conductor member 6 for the emitter has an inwardly protruding tongue 6*a* (FIG. 2) to which the gold wire 7′ for connection with the emitter 2*a* is attached.

In contrast to the emitter conductor member 6, the ring-shaped conductor member 5 for the base is not planar but is given the above-mentioned cup-shaped design. This increases the mechanical stability of the entire device and also improves the electrical properties of the assembly. It is preferable to have the top side of the inner portion of the conductor member 5 located at least as high as the top side of the transistor 2, to facilitate connecting the base electrode 2*b* with the conductor member 5 by a thin gold wire 7 without touching the collector zone of the transistor. In other respects, the contacting of the base electrode 2*b* may be identical with the contacting method and means employed for the emitter electrode.

As shown, the conductor member 5 for the base electrode 2*b* extends to the outside far beyond the periphery of the housing. This facilitates making the necessary electric connection with the base when mounting the encapsulated transistor into an apparatus and also improves the dissipation of heat from the system thus providing for better cooling during operation.

It is advisable to take care that the connecting points for emitter, collector and base are approximately located in a single plane because this greatly contributes to reducing the effect of coupling capacitances. This is realized with good approximation in the embodiment illustrated.

Figure 2:
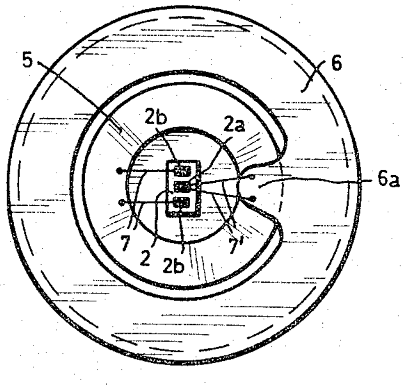
FIG. 2 shows a top view of the transistor, the cover portion of the capsule being removed, except that the mesa transistor in the device shown in FIG. 2 is somewhat different from the one shown in FIG. 1.

A further reduction of the coupling capacitances is obtained by employing screening sheets. In the most frequently occurring case of using the transistor in grounded-base configuration, the shielding sheet is preferably connected with the conductor member 5 for the base, as is shown in FIGS. 1 and 2. That is, the ring-shaped conductor member 5 is given such a large diameter that it simultaneously serves as a shield. When the transistor is used in grounded-emitter configuration, the shielding sheet is preferably joined with the ring-shaped conductor for the emitter. In this case this conductor can be given exactly the same design as is illustrated for the base conductor. It is then only necessary to connect the emitter electrode with the ring-shaped conductor 5, and the base electrode with the conductor member 6.

As shown in FIG. 1, the shielding sheet is inwardly extended by means of a central shield 8 which is joined with the ring-shaped conductor member 5, for example by spot welding. It is preferable to have the shielding sheet 8 located as close as feasible above the top side of the mesa transistor and to give the sheet 8 a sufficient size for fully covering the transistor. As a result, an electrical effect due to capacitance between the housing, particularly the cover portion 9, and the transistor 2 is largely prevented because the shielding sheet 8 excludes the occurrence of capacitive coupling between the large-area connections located opposite each other. For reducing the inductivity of the electric leads, the conductor for the emitter electrode is given a relatively large conducting cross section, namely the design of a ring, and is brought as close as feasible to the transistor, this being facilitated by the above-mentioned protruding tongue 6*a*. The tongue 6*a* shortens the length of the wire 7′ and consequently its inductivity. If desired, a corresponding inwardly protruding tongue may also be provided at the other ring-shaped conductor member which comes much closer to the transistor.

In the illustrated embodiment the cover 9, preferably of metal, serves as the external emitter terminal by means of which the emitter voltage is supplied for operating the transistor. This use is facilitated by the threaded stud integral with the cover 9. The cover leaves sufficient space above the shielding sheet 8 for accommodating any substances which may be inserted for stabilizing the transistor.

While FIG. 2 essentially shows the same device as FIG. 1 after removing the cover 9 and the shielding sheet 8, the mesa transistor according to FIG. 2 is provided with two base electrodes 2*b* and an intermediate emitter electrode 2*a*. Two connecting wires 7 extend from the base electrodes 2*b* to the ring-shaped conductor member 5. The emitter electrode 2*a* is connected with the tongue 6*a* of the conductor member 6 by wire 7′.

The following numerical examples will be of interest, although it will be understood that other dimensions may be chosen. The generally cylindrical conductor rod 1 may be given a diameter of about 1 mm. and a length of about 0.8 to 1 cm. The semiconductor device secured to the top face of the rod 1 has a horizontal bottom area of 0.5 $mm.^2$ and a thickness of 0.1 to 0.2 mm. The radius of the base conductor member 5 is about 1 cm., the radius and height of the cover 9 is 0.5 to 0.6 cm. each. The connections for the emitter, collector and base are spaced from a median plane less than 0.5 mm.

In comparison with FIG. 1, the modification shown in FIG. 2 possesses another peculiarity. That is, the two wires 7′ which connect the emitter electrode 2*a* with the tongue 6*a* of the conductor member 6 are somewhat spread apart from each other. This reduces the total inductivity of the assembly to a further extent, particularly if the tongue 6*a* extends to the immediate proximity of the emitter electrode and the wires 7′ are kept correspondingly short. This feature is also of advantage with other electrodes, particularly in cases where several emitter and base electrodes are present.

While the invention has been described above with particular reference to a mesa transistor, it affords the same advantages with planar and other transistors for use at high frequencies.

From the embodiments described in the foregoing with reference to the drawings, the essential features and advantages of our invention will be recognized as follows.

A plurality of concentric ring-shaped electrode conductors and a plurality of coaxial insulating rings are joined with each other so as to form a transistor housing together with a centrally located conductor rod. The sequence of these parts is such that a first insulating ring is joined with the top of the conductor rod, a first ring-shaped and concentric electrode conductor is located on top of the first insulating ring and is followed by a second insulating ring on whose top a second ring-shaped electrode conductor is located, the housing being completed by a cover or cup of bell-shaped configuration.

It is of considerable advantage for assembling purposes if the connecting points for the emitter and base electrodes are located in one and the same plane. This applies particularly to the above-described use of thin connecting wires between the ring-shaped conductor members and the respective electrodes. Thus placing the connecting points in a single plane considerably simplifies fastening these wires by thermocompression. The two ring-shaped conductor members are preferably located slightly above the electrodes, particularly at the point to be directly connected with the connecting wire, so that the connecting wires, once attached, do not touch the semiconductor surface at undesired places.

For operation in grounded-based configuration, the collector-emitter capacitance is a decisive magnitude with respect to the occurrence of spurious oscillations; and the same applies to the base-collector capacitance for operation in grounded-emitter configuration. It is advisable, therefore, to design the base-electrode conductor member so that it shields the emitter from the collector for operation in ground-base connection. Conversely, for grounded-emitter operation, it is advisable to employ the emitter conductor member as a shield between base and collector.

The design of such shielding is effected preferably as follows.

The electrode conductor member to serve as a shield is disposed between the two other electrode conductors and its ring area is so chosen that the fewest possible electrical lines of force will extend between the two electrode conductor members to be shielded from each other.

When employing a metallic housing cover, this being of advantage for facilitating the electrical connection of one of the electrodes, the one other electrode conductor that is to be grounded can be provided with an additional shielding sheet which protrudes into the space between the housing cover and the transistor or other semiconductor member, and thus furnishes an additional shielding effect.

The ring-shaped electrode conductor member to be employed as a shield extends as closely as feasible to the transistor member (in any event closer than the ring-shaped other conductor member that is to be shielded).

In view of the small size of conventional transistors of the mesa and planar types, a direct engagement of the conductor members with the respective electrodes is in most cases possible only with respect to the collector electrode. For that reason the direct contacting of the two other electrodes of the transistor is effected by means of thin wires, preferably attached by thermocompression, these wires connecting the particular electrode with the one appertaining ring-shaped conductor member.

This particular type of connection also constitutes a means which only slightly influences the capacitances but greatly influences the supply-lead inductivities in a favorable sense. For obtaining a slight inductivity of the device, it is desirable to employ shortest possible wires. Furthermore, the ring-shaped conductor members can be given inwardly protruding tongues, or several connecting wires between one and the same transistor electrode and the appertaining conductor member can be employed in a manner greatly reducing the inductivities of the leads.

Since from the viewpoints described, there results a device in which one ring-shaped electrode conductor member is located somewhat below the other member, it is preferable to give the lower conductor member a design which simultaneously causes it to perform the function of a shielding member. For this purpose, the lower member is given a radially large size so that it extends outwardly far beyond the confines of the transistor capsule. The external portions of this disc-shaped member facilitate the external contact connection and, if desired, can be given any special design for improved cooling. This applies also to the cylindrical conductor rod. Since such auxiliary designs are known as such and not essential to the invention proper, they are not further described or illustrated herein.

The mechanical stability of the device is greatly improved by giving at least one of the ring-shaped conductor members a corresponding profile. It is particularly preferable for this purpose to give the lower ring-shaped conductor member a cup-shaped construction and having in its inner portion a wall extending parallel to the longitudinal axis of the device.

To those skilled in the art it will be obvious upon a study of this disclosure that our invention permits of various modifications and can be given embodiments other than particularly illustrated and described herein, without departing from the essential features of the invention and within the scope of the claims annexed hereto.

We claim:

1. An encapsulated semiconductor device, comprising
a transistor device having a semiconductor body having two substantially planar spaced opposite sides, a collector electrode on one side of said semiconductor body and emitter and base electrodes on the opposite side of said semiconductor body;
an axially elongated substantially cylindrical conductor rod having an axis and an end face to which said semiconductor body is affixed with said collector electrode;
two substantially ring-shaped and mutually insulated conductor members coaxially positioned around said conductor rod and insulated from said conductor rod, said ring-shaped conductor members being respectively conductively connected with said two other electrodes, one of said ring-shaped conductor members being closer to said transistor device than the other of said ring-shaped conductor members and thereby functioning as a shield between said transistor device and the other of said ring-shaped conductor members;
a housing structure tightly joined with said conductor rod and said ring-shaped conductor members and enclosing said transistor device, said housing structure having a lower part, and said housing structure, said ring-shaped conductor members and said transistor device being rotationally symmetrical with respect to the axis of said conductor rod;
a first substantially ring-shaped electrical insulator of determined diameters coaxially positioned around said conductor rod at the lower part of said housing structure and adjacent to and beneath one of said ring-shaped conductor members; and
a second substantially ring-shaped electrical insulator of diameters larger than said determined diameters coaxially positioned around said conductor rod and part of said first ring-shaped insulator and adjacent to and beneath the other of said ring-shaped conductor members, said one of said ring-shaped conductor members being positioned between said first and second ring-shaped insulators.

2. An encapsulated semiconductor device according to claim 1, wherein at least one of said ring-shaped conductor members has an inwardly protruding tongue, and a wire connecting said tongue with one of said respective electrodes.

3. An encapsulated semiconductor device according to claim 1, wherein said emitter and base electrodes have respective points of connection with said respective ring-shaped conductor members located approximately in the same diametrical plane relative to the rod axis.

4. An encapsulated semiconductor device according to claim 1, wherein said shield is connected to said emitter electrode.

5. An encapsulated semiconductor device according to claim 1, wherein said shield is connected to said base electrode.

6. An encapsulated semiconductor device according to claim 1, wherein said housing structure comprises a cup-shaped conductive cover portion joined with the other of said ring-shaped conductor members.

7. An encapsulated semiconductor device according to claim 6, wherein said one of said ring-shaped conductor members protrudes radially beyond the periphery of said housing.

8. An encapsulated semiconductor device according to claim 1, wherein said ring-shaped insulators comprised a first insulating ring surrounding said conductor rod adjacent to said end face and joining said rod with one of said ring-shaped conductor members and a second insulating ring joining said one ring-shaped conductor member with said other ring-shaped conductor member, and said housing structure includes a cup-shaped conductive cover portion joined with said other ring-shaped conductor member.

9. An encapsulated semiconductor device according to claim 8, wherein said first insulating ring has an outer diameter smaller than the inner diameter of said second insulating ring, and wherein said one of said ring-shaped conductor members has a cup-shaped and centrally apertured middle portion with a cylindrical wall extending coaxially between said outer and inner diameters of said respective insulating rings.

10. An encapsulated semiconductor device according to claim 8, wherein said insulating rings and said conductor members have approximately the same thermal coefficients of expansion.

11. An encapsulated semiconductor device according to claim 8, wherein at least one of said ring-shaped conductor members has a portion protruding in an axial direction away from one of said insulating rings, said protruding portion being ring-shaped and rotationally symmetrical relative to said axis for increasing the mechanical stability of the device.

12. An encapsulated semiconductor device, comprising a semiconductor member having a semiconductor body having two substantially planar spaced opposite sides with at least three electrodes of which one is located on one side and two on the opposite side of said semiconductor body;

an axially elongated substantially cylindrical conductor rod having an axis and an end face to which said semiconductor body is affixed with said one electrode;

two substantially ring-shaped and mutually insulated conductor members coaxially positioned around said conductor rod and insulated from said conductor rod, said ring-shaped conductor members being respectively conductively connected with said two other electrodes, one of said ring-shaped conductor members being closer to said semiconductor member than the other of said ring-shaped conductor members and having a position and configuration whereby it functions as a shield between said semiconductor member and the other of said ring-shaped conductor members;

a housing structure tightly joined with said conductor rod and said ring-shaped conductor members and enclosing said semiconductor member, said housing structure having a lower part, and said housing structure, said ring-shaped conductor members and said semiconductor member being rotationally symmetrical with respect to the axis of said conductor rod; and two substantially ring-shaped electrical insulators of different diameters coaxially positioned around said conductor rod in substantially concentric relationship to each other one within the other, said insulators being positioned at the lower part of said housing structure.

13. An encapsulated semiconductor device, comprising a semiconductor member having a semiconductor body having two substantially planar spaced opposite sides with at least three electrodes of which one is located on one side and two on the opposite side of said semiconductor body;

an axially elongated substantially cylindrical conductor rod having an axis and an end face to which said semiconductor body is affixed with said one electrode;

two substantially ring-shaped and mutually insulated conductor members coaxially positioned around said conductor rod and insulated from said conductor rod, said ring-shaped conductor members being respectively conductively connected with said two other electrodes, one of said ring-shaped conductor members being closer to said semiconductor member than the other of said ring-shaped conductor members and thereby functioning as a shield between said semiconductor member and the other of said ring-shaped conductor members;

a housing structure tightly joined with said conductor rod and said ring-shaped conductor members and enclosing said semiconductor member, said housing structure having a lower part, and said housing structure, said ring-shaped conductor members and said semiconductor member being rotationally symmetrical with respect to the axis of said conductor rod, said housing structure including a cup-shaped conductive cover portion joined with said other ring-shaped conductor member; and two substantially ring-shaped electrical insulators of different diameters coaxially positioned around said conductor rod in substantially concentric relationship to each other one within the other, said insulator being positioned at the lower part of said housing structure, said ring-shaped insulators comprising a first insulating ring surrounding said conductor rod adjacent to said end face and joining said rod with one of said ring-shaped conductor members and a second insulating ring joining said one ring-shaped conductor member with said other ring-shaped conductor member, said ring-shaped conductor members protruding radially and peripherally beyond said insulating ring members to the outside of said housing.

14. An encapsulated semiconductor device, comprising a semiconductor member having a semiconductor body having two substantially planar spaced opposite sides with at least three electrodes of which one is located on one side and two on the opposite side of said semiconductor body;

an axially elongated substantially cylindrical conductor rod having an axis and an end face to which said semiconductor body is affixed with said one electrode;

two substantially ring-shaped and mutually insulated conductor members coaxially positioned around said conductor rod and insulated from said conductor rod; said ring-shaped conductor members being respectively conductively connected with said two other electrodes, one of said ring-shaped conductor members being closer to said semiconductor member than the other of said ring-shaped conductor members and thereby functioning as a shield between said semiconductor member and the other of said ring-shaped conductor members;

a housing structure tightly joined with said conductor rod and said ring-shaped conductor members and enclosing said semiconductor member, said housing structure having a lower part, and said housing structure, said ring-shaped conductor members and said semiconductor member being rotationally symmetrical with respect to the axis of said conductor rod;

two substantially ring-shaped electrical insulators of different diameters coaxially positioned around said conductor rod in substantially concentric relationship to each other one within the other, said insulators being positioned at the lower part of said housing structure; and a conducting shield member mounted between said semiconductor member and said housing structure and affixed to and conductively connected with said one of said ring-shaped conductor members.

15. An encapsulated semiconductor device, comprising a semiconductor member having a semiconductor body having two substantially planar spaced opposite sides with at least three electrodes of which one is located on one side and two on the opposite side of said semiconductor body;

an axially elongated substantially cylindrical conductor rod having an axis and an end face to which said semiconductor body is affixed with said one electrode;

two substantially ring-shaped and mutually insulated conductor members coaxially positioned around said conductor rod and insulated from said conductor rod, said ring-shaped conductor members being respectively conductively connected with said two other electrodes, one of said ring-shaped conductor members being closer to said semiconductor member than the other of said ring-shaped conductor members and thereby functioning as a shield between said semiconductor member and the other of said ring-shaped conductor members;

a housing structure tightly joined with said conductor rod and said ring-shaped conductor members and enclosing said semiconductor member, said housing structure having a lower part, and said housing structure, said ring-shaped conductor members and said semiconductor member being rotationally symmetrical with respect to the axis of said conductor rod, said housing structure including a cup-shaped conductive cover portion joined with said other ring-shaped conductor member;

two substantially ring-shaped electrical insulators of different diameters coaxially positioned around said conductor rod in substantially concentric relationship to each other one within the other, said insulators being positioned at the lower part of said housing structure; said ring-shaped insulators comprising a first insulating ring surrounding said conductor rod adjacent to said end face and joining said rod with one of said ring-shaped conductor members and a second insulating ring adjoining said one ring-shaped conductor member with said other ring-shaped conductor member; and a conducting shield member mounted between said semiconductor member and said cover portion and affixed to and conductively connected with one of said ring-shaped conductor members.

16. An encapsulated semiconductor device, comprising a semiconductor member having a semiconductor body having two substantially planar spaced opposite sides with at least three electrodes of which one is located on one side and two on the opposite side of said semiconductor body;

an axially elongated substantially cylindrical conductor rod having an axis and an end face to which said semiconductor body is affixed with said one electrode;

two substantially ring-shaped and mutually insulated conductor members coaxially positioned around said conductor rod and insulated from said conductor rod, said ring-shaped conductor members being respectively conductively connected with said two other electrodes, one of said ring-shaped conductor members being closer to said semiconductor member than the other of said ring-shaped conductor members and having a position and configuration whereby it functions as a shield between said semiconductor member and the other of said ring-shaped conductor members;

a housing structure tightly joined with said conductor rod and said ring-shaped conductor members and enclosing said semiconductor member, said housing structure having a lower part, and said housing structure, said ring-shaped conductor members and said semiconductor member being rotationally symmetrical with respect to the axis of said conductor rod, said housing structure including a cup-shaped conductive cover portion joined with said other ring-shaped conductor member; and two substantially ring-shaped electrical insulators of different diameters coaxially positioned around said conductor rod in substantially concentric relationship to each other one within the other, said insulators being positioned at the lower part of said housing structure, said ring-shaped insulators comprising a first insulating ring surrounding said conductor rod adjacent to said end face and joining said rod with one of said ring-shaped conductor members and a second insulating ring joining said one ring-shaped conductor member with said other ring-shaped conductor member, at least one of said ring-shaped conductor members having a portion protruding in an axial direction away from one of said insulating rings, said protruding portion being cylindrical and rotationally symmetrical relative to said axis for increasing the mechanical stability of the device and extending between the outer periphery of said first insulating ring and the inner periphery of said second insulating ring and being in contact with both said peripheries.

References Cited by the Examiner

UNITED STATES PATENTS

| | | | |
|---|---|---|---|
| 2,878,399 | 3/1959 | Lair | 317—236 |
| 2,880,383 | 3/1959 | Taylor | 317—235 |
| 2,999,964 | 9/1961 | Glickman | 317—234 |
| 3,001,110 | 9/1961 | Frazier | 317—234 |
| 3,196,203 | 7/1965 | Keller | 317—235 X |

FOREIGN PATENTS

| | | |
|---|---|---|
| 919,571 | 2/1963 | Great Britain. |

OTHER REFERENCES

RCA Receiving Tube Manual, copyright 1956, pages 7 and 8.

JOHN W. HUCKERT, *Primary Examiner.*

A. M. LESNIAK, *Assistant Examiner.*